United States Patent
Jeon et al.

(10) Patent No.: US 10,988,006 B2
(45) Date of Patent: Apr. 27, 2021

(54) DOOR FOR VEHICLE

(71) Applicants: Hyundai Motor Company, Seoul (KR); Kia Motors Corporation, Seoul (KR); Duckyang Ind. Co., Ltd., Ulsan (KR)

(72) Inventors: Dongmin Jeon, Suwon-Si (KR); Kwang Seub Kim, Suwon-Si (KR)

(73) Assignees: Hyundai Motor Company, Seoul (KR); Kia Motors Corporation, Seoul (KR); Duckyang Ind. Co., Ltd., Ulsan (KR)

( * ) Notice: Subject to any disclaimer, the term of this patent is extended or adjusted under 35 U.S.C. 154(b) by 127 days.

(21) Appl. No.: 16/509,371

(22) Filed: Jul. 11, 2019

(65) Prior Publication Data

US 2020/0262275 A1    Aug. 20, 2020

(30) Foreign Application Priority Data

Feb. 19, 2019   (KR) .................. 10-2019-0019273

(51) Int. Cl.
   *B60J 5/04*   (2006.01)

(52) U.S. Cl.
   CPC ........... *B60J 5/0443* (2013.01); *B60J 5/0413* (2013.01); *B60J 5/0415* (2013.01); *B60J 5/0425* (2013.01); *B60J 5/0469* (2013.01)

(58) Field of Classification Search
   CPC ...... B60J 5/0443; B60J 5/0413; B60J 5/0415; B60J 5/0425; B60J 5/0469
   See application file for complete search history.

(56) References Cited

U.S. PATENT DOCUMENTS

| | | | | |
|---|---|---|---|---|
| 2,797,130 A | * | 6/1957 | Renno | B60J 5/0412 49/502 |
| 5,536,060 A | * | 7/1996 | Rashid | B60J 5/045 296/146.5 |
| 5,819,473 A | * | 10/1998 | Hashimoto | B60J 5/0416 49/502 |
| 6,196,607 B1 | * | 3/2001 | Gulisano | B60R 13/01 293/115 |
| 6,412,852 B1 | * | 7/2002 | Koa | B60R 13/0206 296/146.5 |
| 10,493,830 B2 | * | 12/2019 | Hofer | B60J 5/0413 |
| 2007/0125003 A1 | * | 6/2007 | Wartzack | B60J 10/86 49/502 |

(Continued)

FOREIGN PATENT DOCUMENTS

| | | | | |
|---|---|---|---|---|
| EP | 0336565 A2 | * | 10/1989 | ............ B60J 5/0416 |
| GB | 1287160 A | * | 8/1972 | ............ B60J 5/0444 |
| GB | 1355225 A | * | 6/1974 | ............ B60J 5/0481 |

*Primary Examiner* — Lori L Lyjak

(74) *Attorney, Agent, or Firm* — Morgan, Lewis & Bockius LLP

(57) ABSTRACT

A door of a vehicle may include a door internal panel; a door external panel mounted outside a passenger compartment with respect to the door internal panel, detachably coupled to the door internal panel, and made of a lightweight material than the door internal panel; and a reinforcement member mounted between the door external panel and the door internal panel and fastened to the door external panel and the door internal panel to increase rigidity, reducing weight and cost of the door of the vehicle and easily replacing the door external panel.

17 Claims, 4 Drawing Sheets

(56) References Cited

U.S. PATENT DOCUMENTS

| | | | |
|---|---|---|---|
| 2010/0225141 A1* | 9/2010 | Mori | B62D 21/157 |
| | | | 296/146.6 |
| 2017/0240029 A1* | 8/2017 | Moriyama | B60J 5/0433 |
| 2019/0161026 A1* | 5/2019 | Migaki | B60J 5/0426 |
| 2019/0225060 A1* | 7/2019 | Sannohe | B60J 5/06 |

* cited by examiner

DOOR FOR VEHICLE

CROSS-REFERENCE TO RELATED APPLICATION

The present application claims priority to Korean Patent Application No. 10-2019-0019273 filed on Feb. 19, 2019, the entire contents of which is incorporated herein for all purposes by this reference.

BACKGROUND OF THE INVENTION

Field of the Invention

The present invention relates to a door of a vehicle. More particularly, the present invention relates to a door of a vehicle capable of easily replacing a door external panel to reducing weight, cost and maintenance cost.

Description of Related Art

Generally, a vehicle door is provided with a door window to improve the ventilation of the internal to the vehicle, the visibility and the habitability of the passenger, and is usually made of a steel material in consideration of collision stability and the like.

That is, the door external panel and the door internal panel of the steel material form a door skeleton, and a door frame is formed at the upper portion of the panels to form a door window. A door module provided with a regulator for raising and lowering the door window glass is built in the internal space formed by the combination of the door external panel and the door internal panel.

Furthermore, the door internal panel is combined with a door trim as an internal material provided with a door switch or window switch, and an impact beam is installed close to the door external panel to increase the side impact rigidity of the door.

However, in the conventional door structure as described above, since the door internal panel and the door frame are usually made of steel, the weight of the door is increased. Since the door internal panel and the door module are separately manufactured so that the number of parts of the door is increased. When the door external panel is damaged, it is necessary to replace the door panels which are welded together as a whole, increasing the maintenance cost. Thus, it is necessary to develop a more innovative door for a vehicle through reduction of the number of parts of the door, lighter weight of material and easy maintenance.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a door of a vehicle configured for reducing the number of parts of the door by making a plurality of parts forming the door as a door module, reducing the weight and cost by making a part of the door module as a relatively lightweight material instead of the steel material, and also reducing the maintenance cost.

A door of a vehicle according to an exemplary embodiment of the present invention may include a door internal panel; a door external panel mounted outside a passenger compartment with respect to the door internal panel, detachably coupled to the door internal panel, and made of a lightweight material than the door internal panel; and a reinforcement member mounted between the door external panel and the door internal panel and fastened to the door external panel and the door internal panel to increase rigidity of the door.

The door external panel may be made of plastic material; and the door internal panel and the reinforcement member may be made of metal material.

A door trim may be coupled to the door internal panel. An impact beam may be coupled to the door internal panel.

An opening may be formed at the center portion of the door internal panel.

The reinforcement member may be formed in a shape that corresponds to a profile of an external rim of the door external panel.

An opening may be formed at the center portion of the reinforcement member.

The door external panel may be provided with a fastening member having an assembly hole; the reinforcement member may be provided with an assembly hole corresponding to the assembly hole of the fastening member; and a fastener may be inserted into the assembly hole of the fastening member and the assembly hole of the reinforcement member to be fastened to the fastening member and the reinforcement member.

The fastening member may be formed at an inside surface of the door external panel facing the internal to the passenger compartment to protrude toward the reinforcement member.

The door internal panel and the reinforcement member may be coupled to each other through a hamming.

The door external panel may be provided with a finishing flange covering the door internal panel and the reinforcement member.

A door of a vehicle according to an exemplary embodiment of the present invention includes a door external panel and a door trim made of a plastic material, a door internal panel made of a metal material and a reinforcement member, so that the number of parts, weight and cost of the door for a vehicle may be reduced.

Furthermore, when the door external panel is damaged, since only the door external panel may be easily replaced, the cost for manufacturing and repairing the door external panel may be reduced, and it is configured to apply to a small-sized light vehicle through sliming of the door.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
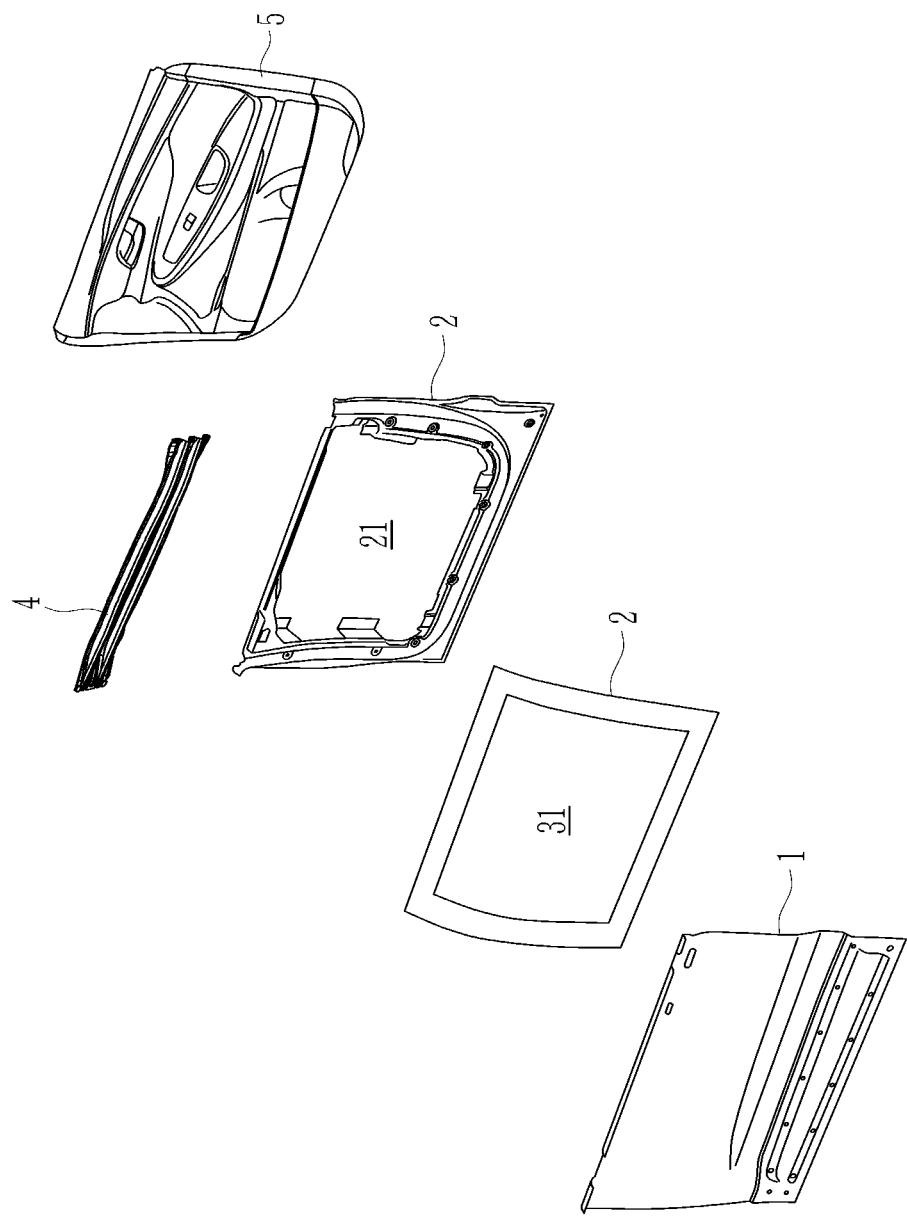
FIG. 1 is an exploded perspective view of a door of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Since size and thickness of each component illustrated in the drawings are arbitrarily represented for convenience in explanation, the present invention is not limited to the illustrated size and thickness of each component and the thickness is enlarged and illustrated to clearly express various parts and areas.

In the following description, dividing names of components into first, second and the like is to divide the names because the names of the components are the same as each other and an order thereof is not particularly limited.

Throughout the specification, unless explicitly described to the contrary, the word "comprise" and variations such as "comprises" or "comprising", will be understood to imply the inclusion of stated elements but not the exclusion of any other elements.

Figure 2:
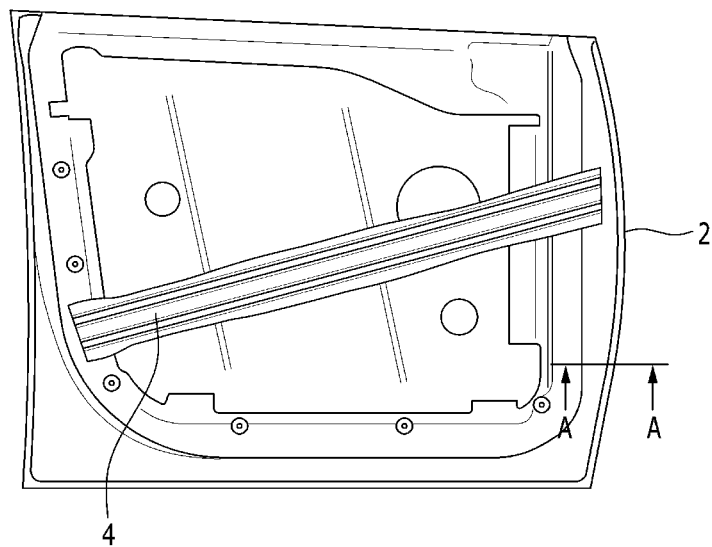
FIG. 2 is a front view of the door of the vehicle according to an exemplary embodiment of the present invention.

Referring to FIG. 1 and FIG. 2, a door of a vehicle according to an exemplary embodiment of the present invention may include a door external panel 1, a door internal panel 2, a reinforcement member 3, an impact beam 4 and a door trim 5.

The door external panel 1 may be mounted outside a passenger compartment and formed of light material, for example plastic material.

The door internal panel 2 may be mounted inside the passenger compartment with respect to the door external panel 1, made of steel material with higher rigidity than the door external panel 1, and the opening 21 is provided at the center thereof, so that weight and cost reduction may be achieved.

In the door internal panel 2, the impact beam 4 may be welded or bolted to reinforce lateral stiffness for preparing side impacts.

The reinforcement member 3 may be detachably coupled to the door external panel 1 to reinforce the rigidity of the door external panel 1.

The reinforcement member 3 may have a wide opening 31 at the center thereof and is formed corresponding to the edge shape of the door external panel 2 to reduce weight and cost.

The reinforcement member 3 may be formed of a steel material, for example, having a higher rigidity than the door external panel 1.

Figure 3:
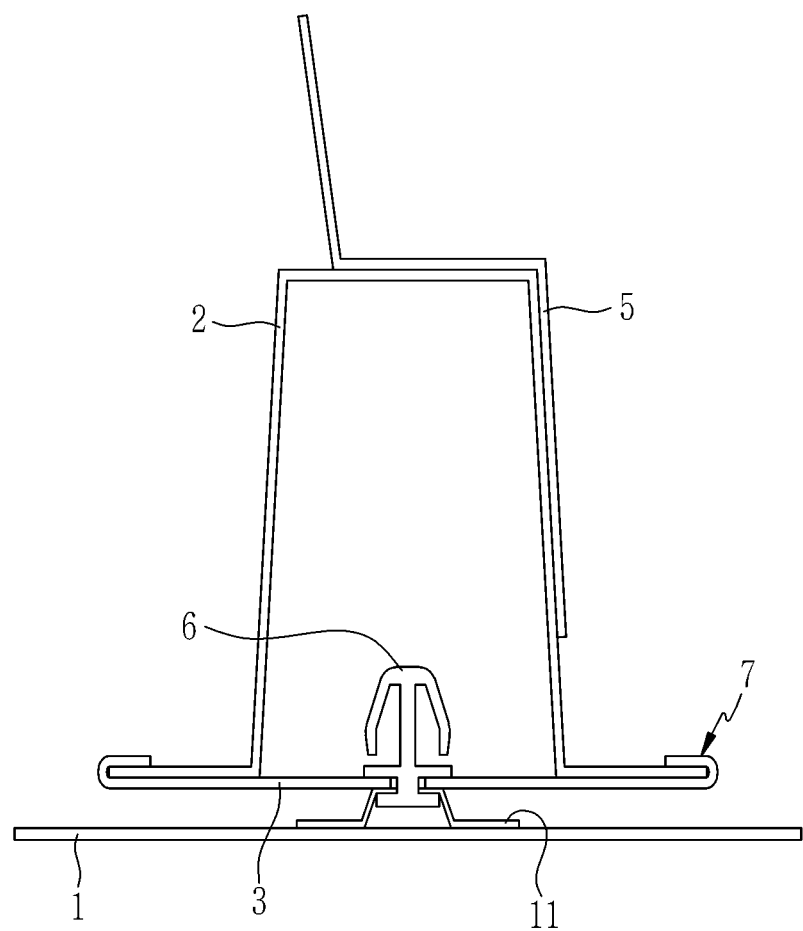
FIG. 3 is a cross-sectional view taken along line A-A of FIG. 2.

Referring to FIG. 2 and FIG. 3, for the fastening of different materials, i.e., for fastening the door external panel 1 of plastic material and the reinforcement member 3 of steel material, during the injection molding of the door external panel 1, a fastening member 11 may be integrally formed on the internal surface of the door external panel 1 to protrude facing the passenger compartment, and an assembly hole 20 may be formed in the fastening member 11.

A known fastener 6 may be inserted and assembled in the assembly hole 20 of the fastening member 11, and a corresponding assembly hole 25 may be also formed in the reinforcement member 3. The fastener 6 may be inserted into the fastening member 11 of the door external panel 1 and assembled into the assembly hole of the reinforcement member 3 so that the door external panel 1 and the reinforcement member 3 of the two different materials are fastened to each other.

The assembly holes may be preferably formed along the rim portion of the door external panel 1 and the reinforcement member 3.

Before the reinforcement member 3 is fastened to the door external panel 1, the reinforcement member 3 and the door internal panel 3 may be pre-assembled through a process of a hemming 7.

Also, the door internal panel 3 and the door trim 5 may be assembled using fasteners as described above.

Figure 4:
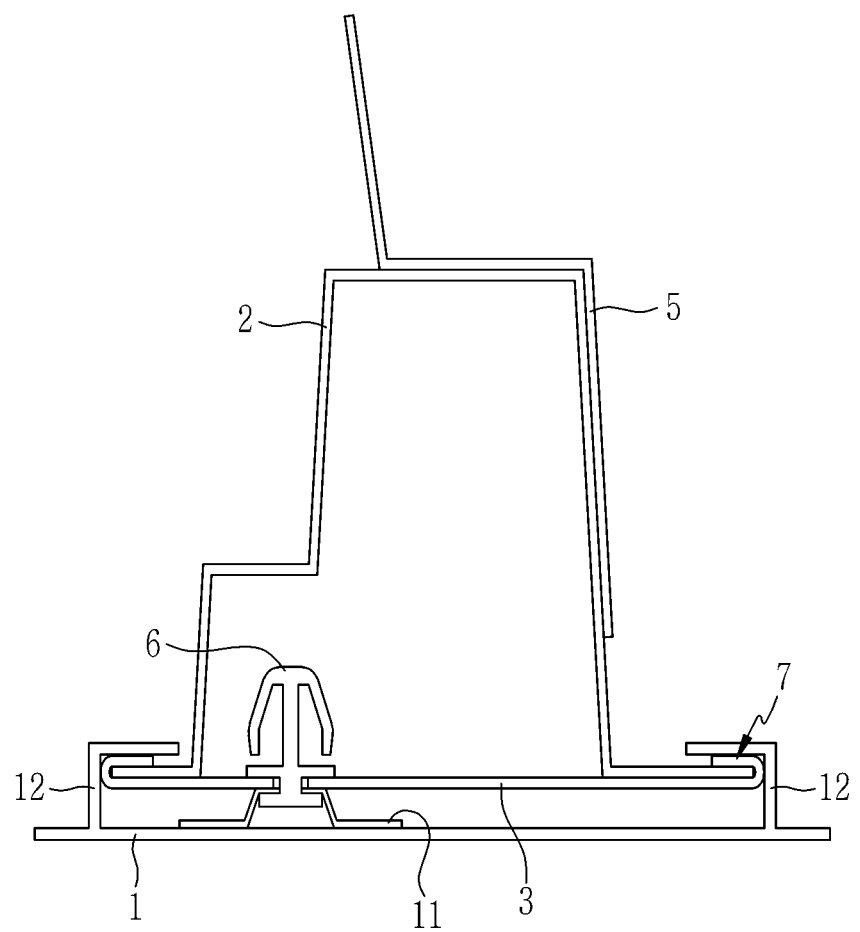
FIG. 4 is a cross-sectional view taken along line A-A of FIG. 2 according to various exemplary embodiments of the present invention.

Referring to FIG. 4 in an exemplary embodiment of the present invention, the door external panel 1 may be formed with a finishing flange 12 integrally bent to improve the aesthetics and to prevent inflow of the foreign material into the door and injury to the door user.

The finishing flange 12 may be formed in a shape that can cover the door internal panel 2 and the hemming 7 of the reinforcement member 3.

As described above, the door of the vehicle according to an exemplary embodiment of the present invention includes the door external panel and door trim of plastic material and the door internal panel and reinforcement member of metal material, so that it is possible to reduce the number of parts, weight and cost of the door for the vehicle. When the door external panel is damaged, since only the door external panel may be replaced easily, the cost of manufacturing and repairing the door external panel may be reduced and the door may be suitably applied to a small-sized light vehicle through slimness of the door.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A door of a vehicle, the door comprising:
a door internal panel;
a door external panel mounted outside a passenger compartment with respect to the door internal panel, detachably coupled to the door internal panel, and made of a material weighing less than a material of the door internal panel; and
a reinforcement member mounted between the door external panel and the door internal panel and fastened to the door external panel and the door internal panel to increase rigidity of the door,
wherein the reinforcement member is formed in a shape that corresponds to a profile of an external rim of the door external panel.

2. The door of the vehicle of claim 1,
wherein the material of the door external panel is plastic material, and
wherein the material of the door internal panel and a material of the reinforcement member are metal material.

3. The door of the vehicle of claim 1,
wherein a door trim is coupled to the door internal panel.

4. The door of the vehicle of claim 1,
wherein an impact beam is coupled to the door internal panel between the door internal panel and the door external panel.

5. The door of the vehicle of claim 1,
wherein an opening is formed at a center portion of the door internal panel.

6. The door of the vehicle of claim 1,
wherein an opening is formed at a center portion of the reinforcement member.

7. A door of a vehicle, the door comprising:
a door internal panel;
a door external panel mounted outside a passenger compartment with respect to the door internal panel, detachably coupled to the door internal panel, and made of a material weighing less than a material of the door internal panel; and
a reinforcement member mounted between the door external panel and the door internal panel and fastened to the door external panel and the door internal panel to increase rigidity of the door,
wherein the door external panel is provided with a fastening member having a first assembly hole;
wherein the reinforcement member is provided with a second assembly hole corresponding to the first assembly hole of the fastening member; and
wherein a fastener is inserted into the first assembly hole of the fastening member and the second assembly hole of the reinforcement member to be fastened to the fastening member and the reinforcement member.

8. The door of the vehicle of claim of claim 7, wherein the fastening member is disposed between the door external panel and the reinforcement member.

9. The door of the vehicle of claim of claim 7,
wherein the fastening member is formed at an inside surface of the door external panel facing the internal to the passenger compartment to protrude toward the reinforcement member.

10. The door of the vehicle of claim of claim 7,
wherein an end portion of the fastener is enclosed inside the door internal panel.

11. The door of the vehicle of claim 7,
wherein the door internal panel and the reinforcement member are coupled to each other through a hamming.

12. The door of the vehicle of claim 11,
wherein the door external panel is provided with a finishing flange covering the hamming of the door internal panel and the reinforcement member.

13. The door of the vehicle of claim 7,
wherein the material of the door external panel is plastic material, and
wherein the material of the door internal panel and a material of the reinforcement member are metal material.

14. The door of the vehicle of claim 7,
wherein a door trim is coupled to the door internal panel.

15. The door of the vehicle of claim 7,
wherein an impact beam is coupled to the door internal panel between the door internal panel and the door external panel.

16. The door of the vehicle of claim 7,
wherein an opening is formed at a center portion of the door internal panel.

17. The door of the vehicle of claim 7,
wherein an opening is formed at a center portion of the reinforcement member.

* * * * *